June 9, 1959  R. G. BERRY  2,890,268
CABLE JOINT SEAL
Filed Aug. 21, 1958
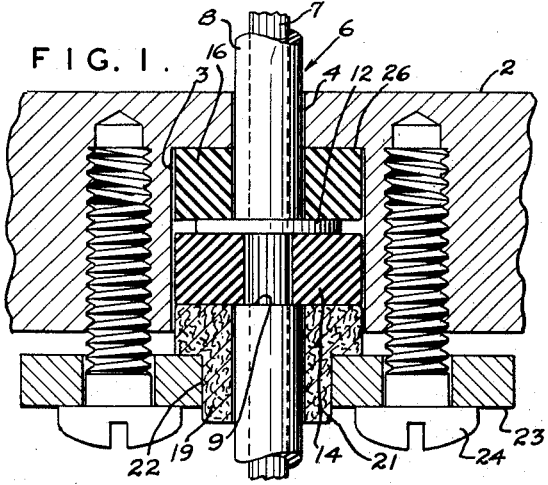
FIG. 1.
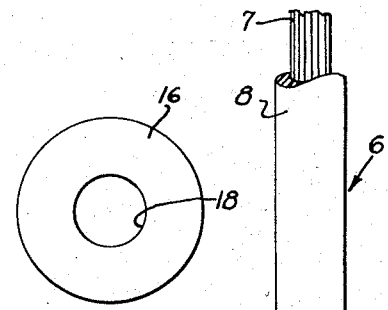
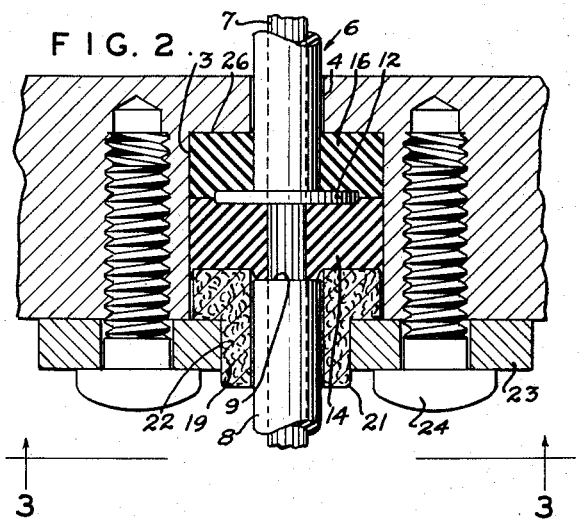
FIG. 2.
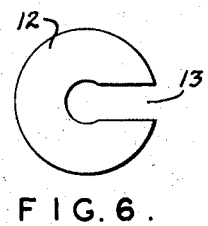
FIG. 5.
FIG. 6.
FIG. 7.  FIG. 4.
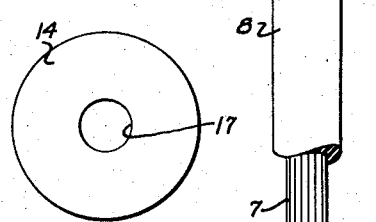
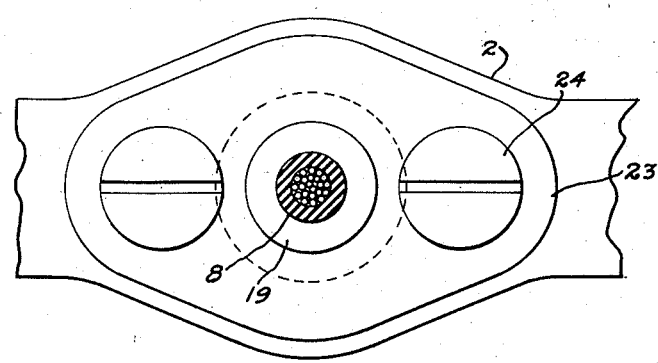
FIG. 3.
INVENTOR.
RUSSELL G. BERRY
BY
Lawrence M. Goodridge
ATTORNEY

United States Patent Office 2,890,268
Patented June 9, 1959

2,890,268

CABLE JOINT SEAL

Russell G. Berry, Maplewood, Mo.

Application August 21, 1958, Serial No. 756,362

4 Claims. (Cl. 174—152)

This invention relates to fluid seals for stranded cables of the type commonly employed as electrical conductors.

In the use of stranded cable leading from tanks filled with liquid or gases, the liquid or gases tend to creep between and along the strands and sometimes between the strands and an insulating cover provided to enclose the strands. Such leakage of liquids or gases through electrical conductors presents a serious problem in the operation of some types of apparatus and must, therefore, be prevented.

For example, in internal combustion engine fuel systems provided with electric fuel pumps submerged in a tank of liquid fuel, the fuel within the motor housing is under pump pressure and, if not prevented, passes through the interior of the motor cable into a motor control box located on the top of the tank and adversely affects the operation and useful life of the electrical contacts therein.

It is, therefore, an object of the invention to provide a stranded cable with a seal effective to prevent leakage of liquids or gases through the interior of the cable.

Another object of the invention is to provide a stranded cable seal which also provides a sealed joint between the cable and an opening in a tank wall.

A further object of the invention resides in the provision of a stranded cable seal embodying a metallic washer soldered to the cable strands to engage the cable against movement relative to a tank wall.

Another object of the invention resides in the provision of a metallic washer soldered to the cable strands and engaged between a pair of resilient washers to provide a seal for the cable.

Another object of the invention is to provide a cable seal embodying means to compress the resilient washers within a recess in a tank wall or the like to provide a seal between the cable strands and the walls defining the recess.

Another object is to provide a stranded cable seal which is relatively simple and inexpensive in construction and reliable in use.

The invention embodies other novel features, details of construction, and arrangement of parts, which are hereinafter set forth in the specification and claims, and illustrated in the accompanying drawing, wherein:

Fig. 1 is a vertical sectional view illustrating a cable joint seal structure embodying features of the invention, the seal being shown in its uncompressed condition.

Fig. 2 is a view, corresponding to Fig. 1, showing the seal in its compressed condition to prevent leakage of fluid therethrough.

Fig. 3 is a view taken along the line 3—3 of Fig. 2.

Fig. 4 is a detail elevational view illustrating the manner in which the insulation is cut away from a portion of the cable.

Figs. 5, 6, and 7 are detail elevational views illustrating outer, intermediate, and inner washers, respectively, embodied in the seal structure.

Referring now to the drawing for a better understanding of the invention, the cable seal structure is shown as comprising a wall 2 having coaxial inner and outer bores 3 and 4, respectively, to receive a conventional electrical conductor or cable 6 having a plurality of metallic strands 7 enclosed within an insulating cover 8 which is cut away at 9 to expose the strands.

A split metallic washer 12 having a slot 13 is centrally positioned on the strands 7, and secured thereto by means of solder, which also fills said slot and the interstices between the strands to form a solid metallic section free of voids. In the event the solder does not readily adhere to the metallic strands 7, it will be understood that the strands may be tinned or otherwise treated, either during manufacture of the cable or prior to the application of the solder. The washer may be formed from sheet metal having a thickness of, for example, 0.030 inch.

Inner and outer resilient, synthetic rubber washers 14 and 16, respectively, are sleeved over the cable to engage opposite sides of the metallic washer 12, the rubber washers having an outer diameter substantially conforming to the diameter of the inner bore 3 for snug engagement therein. The inner rubber washer 14 is formed with an inner peripheral surface 17 snugly embracing the metallic section 11, and the outer rubber washer is formed with an inner peripheral surface 18 snugly embracing the insulating cover 8.

A fiber bushing 19 is sleeved over the cable 6 for abutting engagement against the inner rubber washer 14, and is formed with a boss 21, engaged in an aperture 22, provided in a clamping plate 23, secured to the inner side of the wall 2 by cap screws 24. During tightening of the cap screws 24, the plate 23 is moved toward the wall 2 to compress the rubber washers 14 and 16 against a shoulder 26 at the end of the bore 3, to provide a leak-proof joint between the cable 6 and the wall 2. By forming the metallic washer 12 of relatively thin sheet metal, opposed portions of the resilient rubber washers 14 and 16 are in abutting engagement encircling the metallic washer.

A cable joint seal of the type herein shown and described is adapted for use with an internal combustion engine fuel system, provided with a submerged motor-driven fuel pump of the type disclosed in a copending application, Serial No. 431,744, filed May 24, 1954 (now U.S. Patent No. 2,807,395), in the name of Alfred C. Korte, in which fuel is under pump pressure within the motor housing and tends to pass through the cable to the interior of a motor control box located outside the fuel tank. It is, therefore, necessary to prevent leakage of fuel through the cable to prolong the life of the motor control contacts within the control box. It will be noted that the metallic washer 12 also serves as a support for the cable 6.

Certain structures have been described herein which will fulfill all the objects of the present invention, but it is contemplated that other modifications will be obvious to those skilled in the art which come within the scope of the invention as defined by the appended claims.

I claim:

1. In a fluid stop for a cable having a stranded metallic conductor in an insulating cover, an exposed section of stranded conductor, solder filling the interstices in the exposed section of the stranded conductor to provide a section of solid metal, a metallic washer in soldered engagement with said section, resilient synthetic rubber washers encircling said cable and engaging opposite sides of said metallic washer, a housing snugly enclosing said washers, and means to compress said washers within said housing.

2. In a fluid stop for a cable having a stranded metallic conductor in an insulating cover, an exposed section of stranded conductor, solder filling the interstices in the exposed section of the stranded conductor to provide a section of solid metal, a metallic washer in soldered engagement with said section, resilient synthetic rubber washers encircling said cable and engaging opposite sides of said metallic washer, a housing snugly enclosing said washers, and means to compress said washers within said housing, said metallic washer having a slot to receive said section.

3. In a fluid stop for a cable having a stranded metallic conductor in an insulating cover, an exposed section of stranded conductor, solder filling the interstices in the exposed section of the stranded conductor to provide a section of solid metal, a metallic washer in soldered engagement with said section, resilient synthetic rubber washers encircling said cable and engaging opposite sides of said metallic washer, a housing snugly enclosing said washers, and means to compress said washers within said housing, said metallic washer having a slot to receive said section, said rubber washers being of larger diameter than said metallic washer for abutting circular engagement with each other adjacent the outer periphery of said metallic washer.

4. In a fluid stop for a cable having a stranded metallic conductor in an insulating cover, an exposed section of stranded conductor, solder filling the interstices in the exposed section of the stranded conductor to provide a section of solid metal, a metallic washer in soldered engagement with said section, resilient synthetic rubber washers encircling said cable and engaging opposite sides of said metallic washer, a housing snugly enclosing said washers, means to compress said washers within said housing, said metallic washer having a slot to receive said section, said rubber washers being of larger diameter than said metallic washer for abutting circular engagement with each other adjacent the outer periphery of said metallic washer, said means comprising a fiber washer engaged between a plate and one of said rubber washers, and screws connecting said plate to said housing.

References Cited in the file of this patent

UNITED STATES PATENTS

| | | |
|---|---|---|
| 1,267,832 | Wilkinson | May 28, 1918 |
| 1,461,629 | Schmidt | July 10, 1923 |
| 2,200,115 | Lessmann | May 7, 1940 |
| 2,563,829 | Fitzgerald et al. | Aug. 14, 1951 |